United States Patent [19]
Martinez

[11] 3,778,973
[45] Dec. 18, 1973

[54] BUBBLE TRAP FOR REMOVAL OF BUBBLES FROM BIOLOGICAL FLUIDS UNDER STERILE CONDITIONS

[75] Inventor: Felix Jesus Martinez, Palatine, Ill.

[73] Assignee: Baxter Laboratories, Inc., Morton Grove, Ill.

[22] Filed: Dec. 23, 1971

[21] Appl. No.: 211,397

[52] U.S. Cl. ............................................. 55/199
[51] Int. Cl. ........................................... B01d 19/00
[58] Field of Search ................. 55/36, 41, 46, 57, 55/159, 178, 189, 199, DIG. 14; 128/214 C; 159/DIG. 4; 210/DIG. 23; 261/DIG. 26, DIG. 28

[56] References Cited
UNITED STATES PATENTS

| | | | |
|---|---|---|---|
| 1,424,756 | 8/1922 | Dean et al. | 55/36 |
| 3,042,038 | 7/1962 | Beacham | 128/214 C |
| 3,332,418 | 7/1967 | Brody | 128/214 R |
| 2,352,349 | 6/1944 | Shaw | 128/214 C |

Primary Examiner—Samih N. Zaharna
Assistant Examiner—Richard W. Burks
Attorney—W. Garrettson Ellis

[57] ABSTRACT

A bubble trap for liquid flowing in a conduit comprises an inlet port communicating with one end of a first chamber. The other end of the first chamber is closed, and a lateral port is defined in the side of the first chamber, communicating with the side of a second chamber between the ends thereof. The second chamber has an outlet port at an end opposite the inlet port, and a bubble collection port at an end adjacent the inlet port. The bubble collection port is closed with a resealable diaphragm, to permit the repeated aseptic insertion of a syringe to remove trapped gas.

8 Claims, 3 Drawing Figures

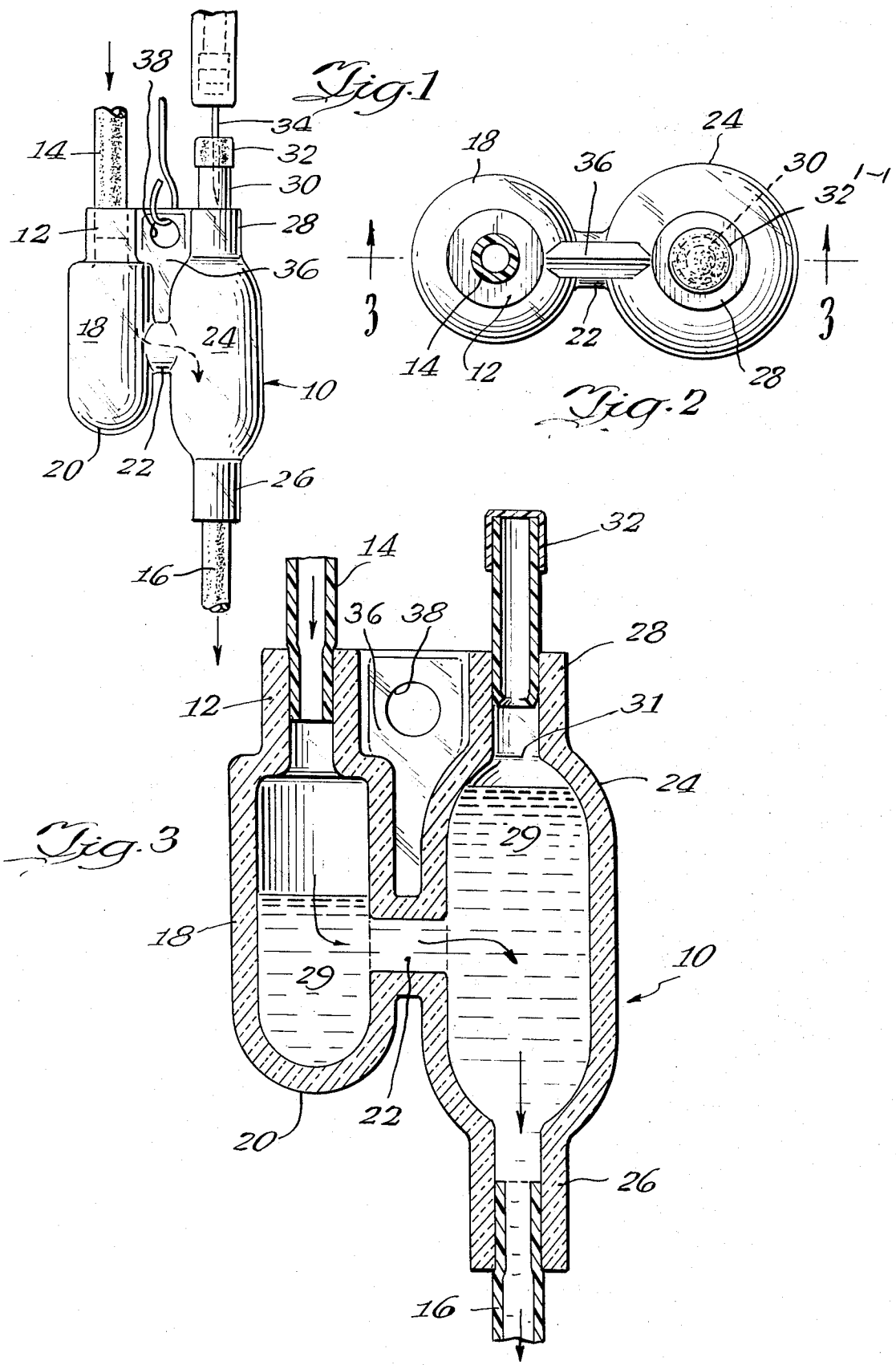

BUBBLE TRAP FOR REMOVAL OF BUBBLES FROM BIOLOGICAL FLUIDS UNDER STERILE CONDITIONS

BACKGROUND OF THE INVENTION

Any biological fluid, such as blood, which is infused parenterally into a living body must be handled to make sure that no significant amount of gas bubbles are infused along with the liquid. At the present time there is a need for a gas bubble trapping device which can be used to remove bubbles from relatively high volume streams of blood or other liquid being infused into a patient while the patient is being dialyzed on an artificial kidney, oxygenated by artificial oxygenation equipment during major surgery, or the like.

The conventional bubble traps tend to allow substantial numbers of very small bubbles to pass into the patient, since the bubbles are swept along by the rapid current of the blood or other liquids.

The device of this invention effectively provides a means of removing small bubbles from a relatively rapid stream of blood or other liquid, storing the gas from the small bubbles in the upper part of a chamber for aseptic removal by a syringe from time to time.

DESCRIPTION OF THE INVENTION

In accordance with this invention, a bubble trap for liquid flowing in a conduit is provided which comprises an inlet port communicating with one end of a first chamber, the other end of the first chamber being closed. A lateral port is also defined in the first chamber intermediate its ends, communicating with a second chamber at a location intermediate its ends. The second chamber has an outlet port at an end opposite the inlet port and a bubble collection port at the end adjacent the inlet port. The bubble collection port is closed with a resealable diaphragm of latex or the like to permit the repeated aseptic insertion of a syringe needle to remove trapped gas.

Typically, the first and second chambers are tubular in shape and parallel to each other, having transverse dimensions which are larger than the transverse dimensions of the inlet and outlet ports and the lateral port.

The bubble trap can be manufactured from a blow molded plastic parison of sufficient thickness to be rigid under normal pressures, to provide dimensional stability.

In the drawings, FIG. 1 is an elevational view of one embodiment of the bubble trap of this invention, shown connected to fragments of a blood line as part of a circuit for blood.

FIG. 2 is a top plan view of the bubble trap of this invention.

FIG. 3 is a sectional view taken along line 3—3 of FIG. 2, showing normal liquid levels in the bubble trap.

In the drawings, a blow-molded plastic bubble trap can be manufactured in accordance with this invention as shown. Bubble trap 10 comprises an inlet port 12 which carries inlet blood line 14 constituting part of a circuit for blood, e.g., from the patient to an artificial kidney, and from there through the bubble trap back to the patient. Blood leaves bubble trap 10 through line 16.

Inlet port 12 communicates with a cylindrical first chamber 18 which is closed at its end 20 opposite inlet 12 with a closure defining a generally hemispherical section.

A lateral port 22 is defined in a side wall of first chamber 18 between the ends thereof, and communicating with a second chamber 24 between its ends. Chamber 24 is also tubular in shape. An outlet port 26 is located at the end of second chamber 24 opposite inlet port 12, and carries outlet blood line 16.

At the end of chamber 24 adjacent inlet port 12, a bubble collection port 28 is defined, carrying tube 30 which is closed at its outer end with latex diaphragm 32. Latex diaphragm 32 is conventionally constructed to be pierceable by syringe needle 34 and to aseptically seal when needle 34 is withdrawn. Needle 34 is used to withdraw air bubbles which gather in bubble collection port 28 in position of use and in the upper portion of chamber 24 as blood passes through the bubble trap.

Chamber 24 extends below hemispherical end 20 of chamber 18, to space outlet port 26 away from lateral port 22, in order to prevent an excessive downward current which might pull some bubbles through outlet port 26.

In use, blood 29 enters the device through inlet 12, where its downward motion is halted, since chamber 18 has closed end 20. After a brief period of gentle turbulence, which tends to permit tiny bubbles in the blood in chamber 18 to rise, the blood is expressed through lateral port 22, with the bubbles still rising to the upper portion of port 22. From there, blood 29 enters chamber 24 and proceeds downwardly through outlet port 26. However, the bubbles have been given the opportunity, during a period of gentle turbulence prior to outlet of the blood, to rise to the upper portion of chamber 24, and from there toward outlet port 28, where the bubbles break to the surface of the blood and form a gas pocket 31 in outlet port 28 and optionally in the upper portion of chamber 24. As stated before, gas pocket 31 is reduced in volume by withdrawal of the gas with a syringe.

Chambers 18 and 24 each have a transverse dimension which is greater than the transverse dimensions of inlet and outlet tubing 14, 16, and transverse port 22, to facilitate the gentle turbulence that permits the efficient removal of tiny gas bubbles in the device of this invention. Port 22 is wider in transverse dimension than tubing 14 and 16, so that the velocity of blood passing through port 22 is relatively slow, compared with the velocity through tubing 14, 16.

Bubble trap 10 also defines a plastic wall 36 between the inlet port and bubble collection port, which wall defines a hanging aperture 38 for convenient vertical suspension of the device.

The above has been offered for illustrative purposes only, and is not to be considered as limiting the scope of this invention, which is defined in the claims below.

I claim:

1. A bubble trap for liquid flowing in a conduit which comprises an inlet port communicating with one end of a first chamber, the other end of said first chamber being closed, a first chamber, the other end of said first chamber being closed, a lateral port defined in said first chamber spaced from the ends thereof, communicating with a second chamber at a location spaced from the ends of said second chamber, said second chamber having an outlet port having a transverse dimension less than the transverse dimensions of said second chamber at an end opposite said inlet port, and a bubble collection port at an end of said second chamber adjacent said inlet port, said bubble collection port being closed with means permitting aseptic removal of trapped gas.

2. The bubble trap of claim 1 in which said bubble collection port is closed with a resealable diaphragm to permit the repeated aseptic insertion of a syringe needle to remove trapped gas.

3. The bubble trap of claim 2 in which said first and second chambers are tubular in shape and parallel to each other, having transverse dimensions which are larger than the transverse dimensions of said inlet port and said lateral port.

4. The bubble trap of claim 3 which comprises a blow-molded, plastic parison of sufficient thickness to be rigid under normal pressures.

5. The bubble trap of claim 4 which defines a plastic wall between said inlet port and bubble collection port, said wall defining a hanging aperture.

6. The bubble trap of claim 3 in which the end of said first chamber opposite said inlet port is generally hemispherical in shape.

7. The bubble trap of claim 6 in which said second chamber extends below said generally hemispherical end.

8. The bubble trap of claim 7 in which said lateral port is larger in transverse dimension than said inlet and outlet ports, whereby the volocity of fluid passing through said lateral port is relatively slow compared with the velocity through said inlet and outlet ports.

* * * * *